United States Patent [19]

Todd

[11] Patent Number: 6,013,304
[45] Date of Patent: *Jan. 11, 2000

[54] HIGH TEMPERATURE COUNTERCURRENT SOLVENT EXTRACTION OF HERB OR SPICE SOLIDS

[75] Inventor: George N. Todd, Kalamazoo, Mich.

[73] Assignee: Kalamazoo Holdings, Inc., Kalamazoo, Mich.

[*] Notice: This patent is subject to a terminal disclaimer.

[21] Appl. No.: 08/991,105

[22] Filed: Dec. 12, 1997

Related U.S. Application Data

[63] Continuation-in-part of application No. 08/766,504, Dec. 13, 1996, Pat. No. 5,773,075.

[51] Int. Cl.[7] .................................................. A23L 1/221
[52] U.S. Cl. ........................ 426/638; 426/651; 426/655; 426/425; 426/429
[58] Field of Search .................................. 426/478, 481, 426/487, 651, 634, 650, 638, 655, 425, 429, 430, 428

[56] References Cited

U.S. PATENT DOCUMENTS

| | | | |
|---|---|---|---|
| 606,624 | 6/1898 | Gebhardt | 426/651 |
| 2,097,405 | 10/1937 | Hall | 99/230 |

(List continued on next page.)

OTHER PUBLICATIONS

Hirayama et al, Journal of the Food Hygenic Society of Japan, "Measurement of Antioxidant Activity in Spices Using an Oxygen Electrode", Abstract, 1986.

Rancidity and its Measurement in Edible Oils and Snack Foods, A Review, Robards, Kerr, and Patsalides, *Analyst*, Feb. 1988, vol. 113.

Water Activity and Food Polymer Science: Implications of State on Arrhenius and WLF Models in Predicting Shelf Life, K. A. Nelson & T. P. Labuza, Journal of Food Engineering 22, 271–289 (1994).

Lipid and Antioxidant Content of Red Pepper, Daood, Biacs, et al., Central Food Research Institute, Budapest, Hungary (1989).

The Nature of Fatty Acids and Capsanthin Esters in Paprika, Nawar et al., Journal of Food Science, vol. 36 (1971).

Riegel's Handbook of Industrial Chemistry, 9th Edition, p. 278.

*Primary Examiner*—Cynthia L. Nessler
*Attorney, Agent, or Firm*—The Firm of Gordon W. Hueschen

[57] ABSTRACT

Principal components of spice and herb plant solids are simultaneously extracted and concentrated with an edible solvent in a series of mixing and high temperature and pressure mechanical pressing steps using edible solvent and a countercurrent extraction procedure. The extract may be hydrated and then centrifuged to remove fine particulate solids and gums. A solution having several times the concentration of pigments and other flavor and aroma and/or antioxidant components of the starting raw material is obtained. The residual press solids may be cooled and hydrated following the last pressing operation. The residual press solids and extract have significantly reduced bacterial counts as a result of the temperatures, high pressure, and high shear utilized, as well as the low moisture levels employed, thus producing not only a food grade extract but also a food grade residual solid having low bacterial counts and predictable, standardized levels of the principal components of interest. The tissue of the residual spice or herb plant solid is ruptured in the process so as to provide quick release of the components thereof when utilized in a food or beverage, this greatly increasing its use effectiveness. The degree of browning or caramelization of the residual press solids is controlled, and the resistance to oxidative deterioration of both the extract and the residual solid is improved, by control of the temperature employed. Additionally, edible antioxidants can be included in the solvent to enhance the stability of both the extract and the residual solid.

11 Claims, 2 Drawing Sheets

6,013,304
Page 2

U.S. PATENT DOCUMENTS

| | | | |
|---|---|---|---|
| 2,246,528 | 6/1941 | Musher | 426/540 |
| 2,384,532 | 9/1945 | Bush et al. | 99/140 |
| 2,507,084 | 5/1950 | Ansel | 99/140 |
| 2,529,710 | 11/1950 | Singh | 99/153 |
| 2,571,867 | 10/1951 | Hall | 99/140 |
| 2,571,948 | 10/1951 | Sair | 99/140 |
| 2,615,813 | 10/1952 | Malter | 99/140 |
| 3,071,475 | 1/1963 | Stohr | 426/540 |
| 3,340,250 | 9/1967 | Sair et al. | 260/236.5 |
| 3,647,487 | 3/1972 | Sair | 99/225 |
| 3,732,111 | 5/1973 | Berner | 99/140 |
| 3,908,031 | 9/1975 | Wistreich et al. | 426/335 |
| 3,939,287 | 2/1976 | Orwig et al. | 426/316 |
| 4,060,645 | 11/1977 | Risler et al. | 426/302 |
| 4,069,351 | 1/1978 | Yano et al. | 426/650 |
| 4,123,559 | 10/1978 | Vitzhum et al. | 426/312 |
| 4,158,708 | 6/1979 | Chiovini et al. | 426/650 |
| 4,198,432 | 4/1980 | Vitzhum et al. | 426/312 |
| 4,210,678 | 7/1980 | Bayusik | 426/521 |
| 4,490,398 | 12/1984 | Behr | 426/312 |
| 4,681,769 | 7/1987 | Bennett | 426/540 |
| 4,790,995 | 12/1988 | Sorensen | 426/302 |
| 4,844,933 | 7/1989 | Hsieh et al. | 426/521 |
| 4,847,106 | 7/1989 | Pike et al. | 426/629 |
| 4,910,027 | 3/1990 | Sorensen | 426/93 |
| 4,925,688 | 5/1990 | Voituriez | 426/281 |
| 4,967,651 | 11/1990 | Hsieh et al. | 99/470 |
| 4,985,265 | 1/1991 | Duboc et al. | 426/425 |
| 5,017,397 | 5/1991 | Nguyen et al. | 426/542 |
| 5,026,550 | 6/1991 | Aeschbach et al. | 424/195.1 |
| 5,059,437 | 10/1991 | Todd, Jr. | 426/250 |
| 5,084,293 | 1/1992 | Todd, Jr. | 426/541 |
| 5,120,558 | 6/1992 | Nguyen et al. | 426/425 |
| 5,230,836 | 7/1993 | Todd, Jr. | 252/407 |
| 5,466,459 | 11/1995 | Wilson | 426/407 |
| 5,503,810 | 4/1996 | Chang | 422/235 |
| 5,523,053 | 6/1996 | Dudek | 422/26 |
| 5,525,260 | 6/1996 | Aeschbach et al. | 252/398 |
| 5,793,075 | 6/1998 | Todd | 426/638 |

HIGH TEMPERATURE COUNTERCURRENT SOLVENT EXTRACTION OF HERB OR SPICE SOLIDS

The present application is a continuation-in-part of my prior-filed application Ser. No. 08/766,504, filed Dec. 13, 1996, now U.S. Pat. No. 5,773,075, issued Jun. 30, 1998.

FIELD OF THE INVENTION

The extraction of the principal significant components of herb and spice plants containing pigment, flavor, and aroma and, when present in the starting material, antioxidant, using edible, food-grade solvent.

Of especial interest is the extraction of the principal significant components of spices and herbs represented by plants of the family Solanaceae, representatively Capsicums such as paprika, red pepper, and chili, and Lycopersicon, representatively tomato, all containing carotenoid pigments; Umbelliferae, representatively celery, lovage, dill, carrot, cilantro, fennel, cumin, caraway, parsley, angelica, and anise; Compositae, representatively marigold, artemisia, and tarragon; Leguminosae, representatively fenugreek; Labiatae, representatively rosemary, thyme, sage, oregano, marjoram, mint, savory, and basil; Zingerberacae representatively ginger, cardamom, and turmeric, Lauraceae, representatively laurel, cinnamon, cassia, and bay; Myrtaceae, representatively allspice and clove; of the genus Myristica, representatively mace and nutmeg; of the genus Piper, representatively black and white pepper; of the genus Vanilla, representatively vanilla; of the genus Allium, representatively onion and garlic; of the genus Sesamum, representatively sesame seed; Cruciferae, representatively mustard and horseradish; the defining characteristic being that it is of a spice or herb plant material from which flavor, aroma, color, and/or antioxidant can be extracted and used to flavor and/or color foods and beverages or otherwise employed to enhance the palatability of foods and beverages.

BACKGROUND OF THE INVENTION AND PRIOR ART

The present invention relates to a method of increasing the stability and reducing the microbial counts of both spice or herb oleoresin and the residual cake from which the oleoresin has been extracted. The process simultaneously extracts and concentrates the principal flavor, aroma, color, and other active components, produces a concentrated and standardized food-grade extract of active components, and a standardized food-grade residual solid, with both the extract and residual solids having significantly reduced microbial counts and frequently also improved stability.

Concentrated extracts of spices and herbs are universally used for flavoring and coloring of food, beverages, and pharmaceuticals. These extracts are traditionally used where a standardized, sterile, and uniform concentrate offers the benefits of control which are inherently difficult to obtain from raw spice or herb, or where the bulk of the raw material is not needed or undesirable.

Ground spice and herb solids are universally used for flavoring, coloring, and imparting otherwise favorable characteristics to food and beverages where the bulk, functional characteristics, and appearance of the food or beverage is important.

Dried spices and herbs, most often in their ground form, are used in the preparation of food and beverages to add flavor, aroma, color, and preservative properties that make the food more palatable and appealing. The dried spices, ground or unground, are usually added to the food or beverage during preparation at such a point in the preparation that time is allowed for the principal components of interest to be extracted into the food or beverage to impart the desired combination of attributes to the food or beverage. Further, as spices and herbs are notoriously known to have inconsistent levels of the flavor, aroma, color, or antioxidants, it is commonly required that spices of varying levels of the principal components of interest be blended to make a final product that is consistent with regard to the principal components of interest to achieve predictable and repeatable performance with respect to the flavor, aroma, color, or antioxidant release into the food or beverage system in which they are used. This is a costly and time consuming process.

As suggested in prior art, much of the flavor, aroma, and/or color often is not effectively transferred to the food or beverage. U.S. Pat. No. 2,507,084 overcomes this obstacle of under-utilization of the principal components of interest by first extracting the principal components of interest and subsequently coating the spent spice from the extraction process with a portion of the extract originally removed, thereby extending the useful amount of flavor and aroma that can be derived from a given quantity of spice. It is also disclosed that this process derives value from the exhausted spice solids, from which the flavor, aroma, color, or antioxidants have been removed, which would otherwise be a waste product. This is a complicated and costly process for recovery of the maximum value of the spice and its principal components of interest.

Traditional extraction processes for the manufacture of concentrated extracts (concentrated several fold as compared with the raw material) involve not only the use of various non-edible solvent systems, but also a large proportion of solvent in relation to the compounds of interest. Many require the use of petroleum distillates, chlorinated solvents, or highly flammable solvents which must be eliminated almost completely from the finished products to make them safe for consumption. These systems require expensive distillation equipment and special precautions must be taken to ensure worker safety and to limit environmental impact. The intensive processing required often destroys, modifies, or loses some of the more unstable compounds, delicate aromas, flavors, or pigments. More significantly, the last traces of undesirable non-edible solvents are very difficult to separate from the concentrated extract. The residual solid must necessarily contain the same residual non-edible solvents, which are removed only with difficulty. Such residual solvents limit the potential use of the residual solid for human consumption, and are potential environmental contaminants.

Other concentration techniques rely on high pressure equipment to obtain good solvating properties from gases, e.g., liquid or supercritical $CO_2$ (U.S. Pat. No. 4,490,398). High pressure liquefied or supercritical gas extraction requires expensive equipment and has limited solvating abilities for some compounds requiring the addition of cosolvents, or solvents such as propane and butane, which are also difficult to control and may be environmentally sensitive or undesirable in a finished product.

Following extraction and desolventization, the concentrated extract is often standardized with edible solvents and emulsifiers to provide a concentrate with reproducible levels of the active or principal compounds of interest to the user.

In an effort to overcome the shortcomings and risks associated with the above-mentioned processes, extraction has been carried out using edible solvents such as vegetable oils or lard. Typical extraction procedures are disclosed in U.S. Pat. Nos. 3,732,111; 2,571,867; and 2,571,948. These methods require a relatively large volume of solvent in relation to the compounds of interest and result in a dilute extract which is limited in its application and which has few of the advantages of the concentrates which can be produced using volatile solvents.

U.S. Pat. No. 4,681,769 discloses a method for simultaneously extracting and concentrating in a series of high pressure countercurrent mechanical presses using relatively small amounts of vegetable oil as the solvent in an attempt to overcome the problem of dilution inherent in earlier processes. This method suffers from severe limitations in temperature and pressure ranges in an attempt to avoid unacceptable oxidative damage, color loss, yield losses, and flavor changes with the final result being that contact times must be unduly extended for up to 16–24 hours, adding greatly to the cost of the process. Extraction cycle times are unduly long for a given size pressing operation, and the process does not provide for a controlled degree of browning or for sterilization of the extract or of the residual solid. It is also limited to temperatures of less than 100° F. to avoid alleged undue oxidation and thus it does not allow for the use of edible solvents which have a melting point of more than 100° F. or which are highly viscous at temperatures of less than 100° F. Maximum pressures of up to about 500 PSI (cone pressure) are claimed and this severely limits the efficiency and throughput rate for a given size pressing operation, as shown by the disclosure of this patent.

Traditional methods for the sterilization of ground spices and herbs involve the use of extremely toxic substances such as ethylene oxide or methyl bromide, irradiation, or steam and moisture treatment to reduce plate counts to less than 100,000. Chemical sterilization and irradiation of spices and herbs are disagreeable to the consumer because of the perceived risk of residual chemicals and/or radiation remaining in the plant matter and, as a result, several processes using added moisture, such as water or steam, at elevated pressures have been developed as alternatives. Typical sterilization procedures are disclosed in U.S. Pat. Nos. 4,210,678, 4,790,995, and 4,910,027. All sterilization processes are inherently costly in that they require a separate processing step or steps to accomplish the sterilization, and also present the possibility of further degrading the more unstable components. Addition of moisture or water vapor, as disclosed in U.S. Pat. Nos. 4,210,678 and 4,910,027, prior to or during the heating and sterilization process results in a cooked aroma not typical of the fresh, dehydrated spice or herb and also results in steam distillation and loss of some of the volatile flavor and aroma constituents.

U.S. Pat. Nos. 4,790,995 and 4,910,027 require the addition of a coating of animal protein to protect the spice from the loss of volatile aroma compounds during the sterilization process with water vapor. U.S. Pat. No. 4,210,678 requires bringing the moisture of the spice to above 8–14%, in some cases up to 16–20%, and holding the spice for an extended period of time prior to sterilization to equilibrate the moisture. This additional step is costly and time consuming. In the case of Capsicums, severe browning and off aromas and flavors are developed in the presence of moistures in excess of 10% at elevated temperatures above 180° F.

Traditional methods for controlling the brownness or degree of caramelization of Capsicum solid to enhance its visual appearance involve the use of elevated temperatures and the addition of vegetable or animal fats or oils to bring up the surface color and luster of the ground spice. This requires a separate and costly processing operation.

Above all, there is the unsolved problem of obtaining satisfactory yields, quality, and throughput rates of acceptable extract having an acceptable content of active principle in the edible solvent without undesirable oxidative damage to, and reduced stability of, the principal compounds of interest, while at the same time providing for simultaneous sterilization of both the herb or spice solid and extract.

Obviously, existing prior art procedures leave much to be desired, and it is a primary objective of the present invention to provide a procedure for the production of sterilized spice and herb products having enhanced stability and which otherwise obviates the shortcomings of the prior art.

OBJECTS OF THE INVENTION

Accordingly, it is an object of the present invention to provide a process for simultaneously and rapidly extracting and concentrating the principal components of herb and spice solids, at temperatures of at least 130° F., preferably 130 to about 450° F., in a process which is completely free of petroleum, chlorinated or highly flammable solvent, does not require high pressure gas handling equipment, does not require distillation for solvent removal, uses only food-grade edible solvents which are typically used in the trade to standardize the resulting extract to a desired concentration, and provides a product of reduced bacterial count which is free of adulterants and impurities.

Another object of this invention is to prepare such a concentrated extract by a process which is simple, environmentally friendly, and economical.

A further object of this invention is to prepare a residual solid or press cake which is edible, free of residual petroleum distillates, chlorinated solvent, or other adulterants, which is standardized with respect to the principal components of commercial interest, which has a predictable and controlled degree of brownness or caramelization, and which has a controlled level of water activity with its attendant increased resistance to oxidative deterioration of carotenoid pigments and color loss where this is otherwise a problem.

Still another object of this invention is to prepare a residual solid or press cake that is standardized with respect to the principal components of interest, that when reground rapidly and efficiently imparts flavor, aroma, color, and/or other principal components of interest to a food or beverage in which it is used, and all without the use of undesirable non-edible solvents that are inherently difficult to remove from spice solids remaining after extraction prior to standardization with respect to the principal components of interest, are environmentally unfriendly, and are perceived by the consumer as being undesirable in the preparation of a food ingredient.

A still further object of this invention is to provide such a process wherein antioxidants can be added to the edible solvent system so as to protect the concentrated extract and the residual solids against oxidative degradation of the principal components of interest, i.e., flavor, aroma, and color, which are extracted from the raw plant material or left in the residual solids.

Still a further object of this invention is to prepare an edible extract and an edible residual solid with reduced microbial activity by a process wherein the moisture of the herb or spice is kept below 10%, preferably below 8%, thereby avoiding the loss of volatile flavor and aroma constituents and avoiding the development of uncontrolled browning and off flavor development at temperatures in excess of 130° F. which are necessary to effect high extraction efficiencies, reduction in microbial activity, and improved stability of the carotenoid pigments in both the extract and in the residual solids.

Yet a further object of this invention is to prepare an extract with increased resistance to oxidative degradation of pigments and consequent color loss.

Still an additional object is to provide a process wherein and whereby the residual spice or herb plant solids have their tissue ruptured so as to produce quick release of the flavor, aroma, color, or antioxidant component therein and thereof when in use in a food or beverage thereby greatly enhancing its use effectiveness, and whereby all products of the process may be conveniently standardized with respect to the principal flavor, aroma, color, or antioxidant component of interest.

Other objects will be apparent to one skilled in the art to which this invention pertains and still others will become apparent hereinafter as the description proceeds.

SUMMARY OF THE INVENTION

The invention, then, inter alia, comprises the following, alone or in combination:

A continuous multistage mixing, high pressure pressing, and countercurrent extraction process for the production of a concentrated edible extract and quick-release edible residual solids, both of reduced bacterial content, and both of which contain herb or spice pigment, flavor, and aroma and, when present in the starting material, antioxidant, from herb or spice plant solids, comprising the following steps:

subjecting said herb or spice solids to a countercurrent extraction process involving a plurality of mixing and pressing stages, including first and last mixing stages and first and last pressing stages, together with up to about fifty percent by weight of an edible solvent, to produce an extract and residual solids, continuously returning the extract from each pressing stage to the previous mixing stage, and finally separating the extract from the first pressing stage and separating the residual solids from the last pressing stage, all pressing stages being carried out at a temperature of at least 130° F.; such a process wherein the temperature is 130 to about 450° F.; such a process wherein the solids are subjected to internal pressures in the press stages of at least 6,000 pounds per square inch; such a process wherein the weight of the edible solvent is 5% to about 20% by weight of the solids; such a process wherein the moisture content of the starting solids is less than 10% by weight, and wherein bacterial count reduction is effected at this low moisture content, thereby avoiding undesirable loss of volatile flavor and aroma constituents and avoiding the development of cooked, off flavors and aromas which occur at higher moisture contents; such a process wherein the solids extracted in the process are selected from the group consisting of chipotle, turmeric, black pepper, onion, rosemary, and oregano; such a process wherein the edible solvent is selected from the group consisting of soybean oil, corn oil, cottonseed oil, rapeseed oil, peanut oil, mono-, di-, or triglycerides, lecithin, edible essential oils, sesame oil, edible alcohols, hydrogenated or partially hydrogenated fats or oils, polyoxyethylene sorbitan esters, limonene, edible animal fats or oils, mixtures thereof, and edible derivatives thereof; such a process wherein fine particulate solids are filtered or centrifuged from the extract and alternatively discarded, returned to a mixing or pressing stage of the process, or incorporated in the final residual solids; such a process which includes the steps of hydrating the final extract to add water to the extent of 5% to 200% by weight of the gums and fine particulate solids therein and filtering or centrifuging to remove said gums and solids; such a process including the step of returning the separated hydrated gums and solids to the final residual solids; such a process including the step of rehydrating the final residual solids with water to a water activity greater than 0.3 $A_W$ for stabilization thereof; such a process wherein the solids are rehydrated to a water activity of about 0.4 to 0.6 $A_W$; such a process wherein an effective stabilizing amount of an edible antioxidant or chelator is included in the edible solvent; such a process wherein the antioxidant comprises an antioxidant selected from the group consisting of lecithin, ascorbic acid, citric acid, tocopherol, ethoxyquin, BHA, BHT, TBHQ, tea catechins, sesame, and the antioxidant activity from an herb of the Labiatae family; such a process wherein the antioxidant comprises a naturally-occurring antioxidant from an herb of the family Labiatae or powdered ascorbic acid; such a process wherein the antioxidant comprises the antioxidant activity from an herb selected from the group consisting of rosemary, thyme, and sage; such a process wherein the temperature is greater than 180° F.; and such a process wherein the temperature is between about 180° F. and 235° F.

Moreover, an extract of herb or spice plant solids produced by the process having a high level of principal flavor, aroma, color, or antioxidant components of interest and a low bacterial count due to the high temperature employed in its production and due to the low water content not greater than 10% in the starting solids; and an extract of herb or spice plant solids having a low bacterial count due to the high temperature employed in its production and having improved stability produced according to the process due to edible antioxidant therein; and residual spice or herb plant solid having a low bacterial count due to the high temperature employed in its production and having its tissue ruptured so as to produce quick release of the principal flavor, aroma, color, or antioxidant component therein, and which is standardized with respect to the principal flavor, aroma, color, or antioxidant component of interest, produced by the process of the present invention.

THE PRESENT INVENTION

IN GENERAL

Raw Capsicum or other spice or herb solids, either ground (usually to pass US 40 mesh, and preferably to pass at least US 20 mesh) or unground if coarse particles are desired in the residual solid or cake, e.g., spice solids having a moisture range of about 0.5% to 16% by weight, preferably 0.5 to 12%, and most preferably 1.5% to 10% by weight (ASTA method 2.0), are subjected to a mixing stage, preferably high shear, and in at least one stage an edible solvent is thoroughly dispersed throughout the raw plant material solids.

Typical spice starting plant materials include, for example but without limitation, those of the genus Capsicum including the dried ripe fruits of *Capsicum frutescens* L. (chilies), *Capsicum annum* L. (Spanish peppers), *Capsicum annum* L. var. *longum Sendt*, its hybrid Louisiana Sport Pepper, and *Capsicum chinense* (Scotch Bonnet or habenero), all by way of example and not by way of limitation.

Other spices and herbs of interest include those of the family Solanaceae, as stated representatively Capsicums such as paprika, red pepper, and chili, and Lycopersicon, representatively tomato, all containing carotenoid pigments; Umbelliferae, representatively celery, lovage, dill, carrot, cilantro, fennel, cumin, caraway, parsley, angelica, and anise; Compositae, representatively marigold, artemisia, and tarragon; Leguminosae, representatively fenugreek; Labiatae, representatively rosemary, thyme, sage, oregano, marjoram, mint, savory, and basil; Zingerberacae, representatively ginger, cardamom, and turmeric, Lauraceae, representatively laurel, cinnamon, cassia, and bay; Myrtaceae, representatively allspice and clove; of the genus Myristica, representatively mace and nutmeg; of the genus Piper, representatively black and white pepper; of the genus Vanilla, representatively vanilla; of the genus Allium, representatively onion and garlic; of the genus Sesamum, representatively sesame seed; Cruciferae, representatively mustard and horseradish; the defining characteristic being that it is a spice or herb plant material from which flavor, aroma, color, and/or antioxidant can be extracted and used to flavor and/or color foods and beverages or otherwise employed to enhance the palatability of foods and beverages.

The comminuted or uncomminuted plant material is subjected to a plurality of mechanical pressing stages, whereby a concentrated extract of principal components is obtained and a final utilizable and preferably standardized residual solid is produced. The selected edible solvent is introduced into the residual solid at a mixing stage at some point prior to the last pressing stage. The edible solvent, now containing extract, is cycled back to the previous stage, thus always supplying a solvent extract with increasing principal component concentration to the previous mixing and pressing stages. As the extract/edible solvent is passed through each stage countercurrent to the solids flow, a portion of the edible solvent is squeezed or pressed out, thereby extracting a portion of the principal components of interest. As the edible solvent/extract passes countercurrent to the solids, the extracted principal components are progressively concentrated in the extract in a continuous process and the residual principal components end up in the final residual solids known as the cake.

By varying the pressure, temperature, spice solids feed rate, solvent addition rate, and the number of mixing and pressing stages, the concentration of the principal components can be controlled in both the extract and the residual solid.

As will be apparent to one skilled in the art, variations in the process of the present invention can be employed to produce variations in result, the most advantageous of which are the production of both plant material extract of standardized marketable potency and edible residual solid plant material also characterized by standardized marketable potency, and with the edible residual solids also characterized by rapid release of the principal components of interest. Moreover, in the process of the present invention, the spice or herb plant solids have their tissue ruptured so as to provide quick release of the flavor, aroma, color, or antioxidant component therein when in actual use, i.e., when incorporated into foods or beverages.

For example, using 200 ASTA paprika starting material of about 5% moisture, a 20% soy oil addition, and leaving a residual cake extractable yield of 9.8% by weight of the starting plant solids material, gives an extract with a color value of 850 ASTA and a residual cake color value of approximately 50 ASTA. Contrastingly, using a 10% soy oil addition (instead of 20%) yields a cake having about 65 ASTA color value and, by increasing the residual cake extractable yield to 12.5% by weight of starting plant solids material, the color value of the residual cake rises to about 100 ASTA and that of the extract to about 1400 ASTA. The lowest color extract for paprika normally traded is 1,000 ASTA.

Although less than 20% edible oil addition is highly desirable and can be used in many cases, with some edible solvent systems wherein the principal compounds of interest have a limited solubility, or when a more dilute extract and/or lower concentration of principal compounds is desired in the residual solids, more than 20% by weight of edible solvent addition will be required inasmuch as a suitable concentration of principal compounds in the finished extract and in residual solid can in some cases be produced only by the employment of the higher dilution.

Due to the successive treatments of high pressure and pressure relief, with pressures ranging from 6,000 to 30,000 PSI in the pressing stages of the operation, in the presence of added edible solvent, e.g., vegetable oil, and due to frictional heat generated in these high pressure zones, both the residual solid and the extract exiting the process surprisingly have a significantly reduced microbial load over that of the starting material even at moisture levels significantly lower than those indicated by the prior art and, also surprisingly, exhibit increased resistance to oxidative degradation of the carotenoid pigments which are responsible for the characteristic red-yellow color of various spices, e.g., Capsicums.

The extract from the first or any selected pressing stage may be centrifuged or filtered to provide the finished extract free of particulate solids. Preferably, the fine particulate solids and gums in the extract may be hydrated to about 5% to 200% by weight of the gums and solids prior to centrifugation or filtration to give a crystal clear extract. If water is not used to hydrate the solids and gums, the fine particulate solids from the extract may conveniently be combined with the final residual solids, recycled back into mixing and pressing stages of the process, or alternatively discarded. If water is used to hydrate the solids and gums, it is preferred that the solids and gums be added back to the final residual press solids or discarded.

The edible solvent employed according to the process of the present invention, as illustrated by the following Examples, may be any edible solvent and especially those selected from the group consisting of soybean oil, corn oil, cottonseed oil, rapeseed oil, sesame oil, peanut oil, mon-, di-, and triglycerides, lecithin, essential oils of spices, herbs, or other plants, edible alcohols, propylene glycol, glycerine, hydrogenated or partially hydrogenated fats or oils, limonene, polyoxyethylene sorbitan esters, or any other edible vegetable or animal fat or oil, or mixture thereof, or edible derivatives thereof, the essential aspects of the solvent being that it serves as an extraction aid in which the principal components of the material being extracted are soluble and that it be edible.

The edible solvent, according to the present invention, is combined with the raw material solids to be processed in a proportion of about 5% to about 50% by weight, and frequently amounts as low as 5 to 20% by weight are possible, based on the weight of the starting raw material solids to be extracted. The lower percentages frequently produce a more acceptable and marketable concentration of principal components of interest in both the extract and the residual solids.

The temperature to be employed during the processing and especially in the pressing stages of the process of the invention may be varied widely, but the process is generally carried out at a temperature below about 450° F., and between about 130° F. and 325° F., most preferably above 180° F. and especially between about 180° F. and 235° F.

Temperatures in excess of 130° F. are advantageously employed to achieve acceptable yields and increased throughput rates as compared to the prior art. Higher temperatures are employed to control an increased degree of browning and, most importantly, to reduce the microbial load of both the solids and the extract while at the same time imparting increased resistance to oxidative degradation of the carotenoid pigments of Capsicums in both the extract and the residual solids. Thus, when it is desired that the residual solids from the process have a desirable darkened, caramelized appearance and/or flavor, a reduced microbial load, and increased resistance to oxidation, this is readily attained by increasing the temperature of the solids and the extract during the process, especially during the pressing stages thereof.

When an antioxidant or chelator is introduced into the process for protection of the spice or herb being processed, this is preferably another plant material or an extract thereof, preferably of the Labiatae family, such as rosemary, thyme, or sage, which is known for its protective antioxidant activity (U.S. Pat. No. 5,209,870), or sesame, or tea catechins, but may alternatively be a suitable edible and preferably an approved food grade additive such as ethoxyquin, BHA, BHT, TBHQ, tocopherol, Vitamin C (e.g., as in U.S. Pat. Nos. 5,290,481, 5,296,249, or 5,314, 686), citric acid, EDTA, or the like. The process of the present invention is particularly adaptable to the extraction of any spice or herb plant material solids containing carotenoid pigments or other components which provide color and/or flavor, pungency, aroma, or antioxidant activity, such as present in rosemary, thyme, sage of the Labiatae genus, to a food with which combined.

DETAILED DESCRIPTION OF THE INVENTION

The following examples are given to illustrate the present invention but are not to be construed as limiting.

EXAMPLE 1

Paprika Extraction:

Dehydrated paprika (5.5% moisture) is ground in a hammer mill and the resulting ground paprika (95% passing US 40 mesh) is admixed with about 10% by weight of soy bean oil and processed in a countercurrent extraction system involving three (3) pressing stages, each using an Egon Keller Model KEK-100 Screw Press, with the extracts from the second and third stages being returned to the preceding mixing stage before being removed from the process at the end of the first press stage. A high shear, high speed pin mixer or equivalent is used to mix the soy oil or extracts from the second and third press stages into the ground spice or residual solid from the preceding stage. This recycling is continuous. The raw material paprika solids are continuously fed at a rate of about 240 lbs. per hour with a total contact time in each mixing stage of about 15–60 seconds. The residence time in each press is 5–60 seconds. The pressing stages are operated at about 10,000 PSI internal pressure and about 200 degrees Fahrenheit, which is maintained by cooling with water through the bore of the press shafts. The starting color value of the ground paprika solids is 200 ASTA. The principal components extracted and standardized in both the extract and the residual solid are the carotenoid pigments. The resulting final soy-paprika extract has a color value of about 1,375 ASTA and the reground paprika residual solid from the final (3rd) press stage has a color value of about 85 ASTA.

Example 1A—Variation:

By varying the percentage of edible solvent employed from about 5% to 20%, the pressure from about 6,000 to 30,000 PSI, the number of countercurrent mixing and pressing stages from 2 to 5, with return of the extract from each press stage to the preceding mix stage before final removal from the process in the first press stage, varying the temperature from about 130° F. to 280° F., and removing the seed from the paprika solids prior to grinding, the resulting extract ranges in color value from about 2,700 ASTA to about 800 ASTA and the residual solids range in color value from 180 ASTA to 35 ASTA.

By regrinding the residual solids (from the final stage) just as is done with fresh, dehydrated paprika, a product in every way comparable to commercially available ground paprika solids is produced. After filtering or centrifuging off the fine particulate solids, the extract can be directly substituted for commercially available paprika oleoresin in every respect.

By varying the pressing temperature of the process from about 130° F. to 325° F., the hue of the reground residual solid is varied from slightly browned to a dark chocolate brown, demonstrating that the degree of brownness can be controlled by the pressing temperature employed. The degree of "brownness" is measured using a Hunter Labscan Spectrocolorimeter with 0 degree illumination, 45 degree circumferential viewing, illuminant D65, 10 degree observer, Ceilab coordinate system. The hue of the paprika powder is measured by placing the powder in a 2.5-inch diameter cuvette, shaking gently to ensure even coverage, and measuring through the bottom of the cuvette. The results of the varied operating temperatures of the process are shown in Table I. The designation L* is indicative of the "lightness" of the sample with the higher numbers being lighter or less browned, and the lower numbers being darker or more browned.

TABLE I

| Processing Temperature | Visual Appearance | L* Values |
| --- | --- | --- |
| 130° F. | Red | 40.18 |
| 150° F. | Tan-Red | 37.25 |
| 200° F. | Light Brown Red | 33.22 |
| 280° F. | Dark Brown Red | 29.16 |
| 325° F. | Chocolate Red | 22.85 |

The data clearly demonstrate that the degree of browning can be controlled by varying the press temperature at which the process is conducted. This broadens the applications or uses of the residual solid to include a base for toasted chili powder and as a replacement for browned, caramelized paprika. The residual solid can be substituted for ground paprika or chili powder in many common applications and a separate processing step for browning to a desired degree is not required.

The starting ground paprika solids have an aerobic plate count (Analysis run according to Bacterial Analytical Manual By AOAC, 8th edition, 1995, and ISO-GRID Methods Manual, 3rd edition, 1989) of about 14,000,000. The residual solids exiting the extraction system have a count of about 2,000 to 200,000, with the lower count being achieved at the higher temperatures. This is a significant reduction and makes the residual solids per se suitable for any application where treatment with ethylene oxide or irradiation would normally be required.

Example 1B—Antioxidant Addition:

The foregoing example is repeated with all materials and conditions being the same, except that the soybean oil edible solvent is supplemented with an antioxidant blend at a concentration of 3% by weight of the original ground paprika solids. The blend consists of about 29% lecithin, 20% powdered ascorbic acid, 5% citric acid, 15% tocopherol, and 1% rosemary extract (in accordance with Chang and Wu U.S. Pat. No. 5,077,069).

The stability of (1) the resulting extract and (2) the residual solids is compared in each case with an untreated control. In such evaluation, the paprika extracts are plated on flour salt to an extent of 2.4% by weight with a mortar and pestle. Two-gram samples are weighed into 13×100 mm test tubes. The test tubes are stored in a thermostatically-controlled oven at 65° C. Samples are withdrawn periodically, extracted with acetone, and the color at 460 nm of a standard (%) dilution in acetone is determined spectrophotometrically. In the evaluation of the residual solids, two-gram samples of the reground residual solid are substituted for the flour salt dispersions.

The procedure for the "standard dilution" is as follows: The initial color of the dispersion is determined by pouring two grams of the original dispersion into a 100-ml flask. Acetone is added up to the 100-ml level. The flask is inverted several times. The flour salt is allowed to settle for five minutes. Then three ml of the dilution is pipetted into a 25-ml flask and diluted up to the 25-ml level. The absorbance is read at 460 nm. The 460 nm color is determined by the formula:

$$460 \text{ nm color} = \frac{(\text{absorbance at } 460/12)}{(\% \text{ dispersion}/100)}$$

where the present dispersion is determined by the formula:

$$\% \text{ dispersion} = \frac{\text{color units on the flour at 460 nm}}{\text{color of the test sample at 460 nm}}$$

to translate to ASTA color, multiply the 460 nm color by 820.

The color is plotted against time and the time for ⅓ of the starting color to fade is reported as the ⅔ life.

This is a highly-reproducible measurement, which is sufficiently accurate to evaluate the effectiveness of the antioxidants and will assist the practitioner to optimize formulations for specific uses.

The final extract from the first press stage of the unprotected or unstabilized process has a color value of about 1375 ASTA and a ⅔ life of 6.5 hours as compared to a color value of about 1600 ASTA and a ⅔ life of 63 hours for the extract from the protected material. The color value of the unprotected or unstabilized residual solids is about 85 ASTA with a ⅔ life of 54 hours, compared to the protected solids which have a color value of about 95 ASTA and a ⅔ life of 155 hours. This clearly demonstrates that inclusion of antioxidants can improve not only the color yields from the extraction process but also at the same time improve the color stability of both the extract and the residual solids.

Other suitable antioxidants (e.g., lecithin, ethoxyquin, butylated hydroxy anisole (BHA), butylated hydroxy toluene (BHT), tertiary butyl hydroxy quinone (TBHQ), sesame, tea catechins, and Labiatae herb antioxidant activity, finely-divided ascorbic acid, tocopherol, citric acid) can be substituted in whole or in part for the specific antioxidant mixture employed with similar desirable color-protective results, preferably a naturally-occurring antioxidant from an herb of Labiatae family, e.g., rosemary, sage, or thyme, or powdered ascorbic acid.

EXAMPLE 2

Effect of Varying Operating Temperatures:

Dehydrated paprika solids (2.5% moisture) were ground in a hammer mill and the resulting ground paprika (95% passing US 40 mesh) was processed with about 15% by weight of soy bean oil in a countercurrent extraction system as in Example 1 involving two (2) pressing stages, with extracts from the second press stage being returned to the preceding (first) mix stage before being removed from the process at the first press stage.

Upon exiting the first press stage, distilled water was metered continuously into the crude extract at a rate of 75% by weight of the gums and solids by means of an inline static mixer. The weight of the gums and fine particulate solids in the extract was determined by diluting one gram of the crude extract in nine grams of acetone. The mixture was spun down for three minutes at 2000 G's in a laboratory centrifuge. The solids separated were air dried and the weight of the gums and solids was calculated as a percentage of the weight of the starting extract. The hydrated gums and solids removed from the extract were continuously returned to the final residual press solids via a high shear, continuous pin mixer installed immediately following a water-jacketed cooling screw which received the residual solids from the second press stage.

Prior to hydration and centrifugation, the extract contained approximately 10% by weight of gums and fine particulate solids as determined by the above-described method. Following hydration and centrifugation the gums and particulate solids amounted to no more than 1% by weight of the extract and the extract was a crystal clear solution, free of any suspended insoluble materials.

The color value of the starting ground paprika was about 150 ASTA. The pressing stages were operated at about 20,000 to 30,000 PSI. The extraction process was started with the presses operating at about 80° F. as measured by the temperature of the cake exiting the presses. The temperature of the presses was controlled by the rate of flow of cooling water through the bore of the press shafts and the screen cages to keep the operating temperatures in the range of 80° to 180° F. Over the time of the extraction run, the operating temperatures of the presses, as measured by the temperature of the cake exiting the presses, was gradually increased to about 255° F. by first slowing and then stopping the flow of cooling water to obtain operating temperatures of 180–200° F., and then by substituting steam for the water in the shaft and cages at gradually increasing pressures to achieve temperatures of 200–255° F. Samples of the extracted oil and press residual solids were pulled at various temperature intervals as the temperatures were increased. Samples of the residual solids were pulled at two points, the first (non-rehydrated) immediately after exiting the cake-cooling screw following the final (second) pressing stage, and the second after the thus-cooled residual press solids were rehydrated to a moisture content of about 10%. The samples were assayed for ASTA color, aerobic and anaerobic plate count, and color stability over time using methods employed in Examples 1A and 1B.

The advantages of operating the process at a temperature above 130° F., as indicated by the temperature of the cake exiting the presses, can clearly be seen. The plate count of both the extract and the cake are progressively reduced as the temperatures are increased. (Tables 2 & 3)

TABLE 2

EFFECT OF INCREASING TEMPERATURES ON THE PLATE COUNT OF THE EXTRACT

| Temperature Degree F | Aerobic Plate Count | Anaerobic Plate Count |
|---|---|---|
| 80 | 1,900,000 | 790,000 |
| 130 | 1,700,000 | 800,000 |
| 150 | 1,700,000 | 660,000 |
| 170 | 1,600,000 | 590,000 |
| 175 | 1,500,000 | 425,000 |
| 180 | 1,300,000 | 380,000 |
| 190 | 360,000 | 150,000 |
| 200 | 300,000 | 200,000 |
| 215 | 240,000 | 150,000 |
| 225 | 190,000 | 65,000 |
| 235 | 170,000 | 32,000 |
| 245 | 69,000 | 8,600 |
| 255 | 3,800 | 830 |

TABLE 3

EFFECT OF INCREASING TEMPERATURES ON THE PLATE COUNT OF THE PRESS SOLIDS

| Temperature Degree F | Aerobic Plate Count | Anaerobic Plate Count |
|---|---|---|
| 80 | 220,000 | 55,000 |
| 130 | 160,000 | 35,000 |
| 150 | 160,000 | 25,000 |
| 170 | 100,000 | 20,000 |
| 175 | 32,000 | 15,000 |
| 180 | 80,000 | 7,400 |
| 190 | 3,500 | 800 |
| 200 | 9,800 | 3,400 |
| 215 | 5,800 | 2,300 |
| 225 | 4,100 | 500 |

TABLE 3-continued

EFFECT OF INCREASING TEMPERATURES ON THE PLATE COUNT OF THE PRESS SOLIDS

| Temperature Degree F | Aerobic Plate Count | Anaerobic Plate Count |
|---|---|---|
| 235 | 1,900 | 1,100 |
| 245 | 5,400 | 100 |
| 255 | 800 | 100 |

The efficiency of extraction is dramatically improved as evidenced by the progressively decreasing ASTA values and the progressively decreasing residual extractable yields of the press residual solids. It is apparent that, to achieve residual extractable yields of less than about 20% by weight of the cake, it is necessary to operate the presses at 130° F. or higher. (Table 4) Moreover, for obvious reasons of efficiency, temperatures above 180° F., and especially between about 180° F. and about 235° F., are greatly preferred.

TABLE 4

PRESS CAKE ASTA AND RESIDUAL YIELDS AT PROGRESSIVELY INCREASING TEMPERATURES

| Temperature Degree F | Press Solids ASTA | Press Solids Residual Yield |
|---|---|---|
| 80 | 87 | 28.28% |
| 130 | 76 | 16.40% |
| 150 | 65 | 15.72% |
| 170 | 61 | 15.72% |
| 175 | 53 | 12.36% |
| 180 | 43 | 13.88% |
| 190 | 42 | 10.84% |
| 200 | 44 | 10.72% |
| 215 | 41 | 9.96% |
| 225 | 39 | 9.50% |
| 235 | 33 | 9.28% |
| 245 | 32 | 9.00% |
| 255 | 35 | 9.80% |

Most importantly, the stability of the extract is not adversely affected and is in fact increased. The results, from Example 2, of an accelerated study on the stability of the extract, generated at varying press operating temperatures, can be seen in Table 5. The accelerated study was done according to the procedures described in Example 1B with the colors reported as a percent of the starting color for each respective sample to adjust for the varying color yields at the respective temperatures. These results demonstrate that the extract produced at higher operating temperatures exhibits increased resistance to oxidative color deterioration. This is surprising, as explained in the following.

TABLE 5

PRESS OLEORESIN (EXTRACT) STABILITY, ACCELERATED, 65° C.

| Temperature Degree F | Hour 2 | Hour 4 | Hour 8 | Hour 12 | Hour 17 |
|---|---|---|---|---|---|
| 80 | 94% | 88% | 81% | 73% | 62% |
| 130 | 94% | 89% | 82% | 75% | 64% |
| 170 | 93% | 89% | 82% | 76% | 65% |
| 225 | 94% | 90% | 82% | 78% | 67% |
| 235 | 94% | 90% | 82% | 77% | 69% |
| 255 | 95% | 90% | 84% | 78% | 72% |

It is commonly believed that lipid-containing systems, when exposed to heat, will exhibit an increased rate of lipid oxidation that, once initiated, will proceed at an ever-increasing rate. (*Rancidity and its Measurement in Edible Oils and Snack Foods, A Review*, Robards, Kerr, and Patsalides, *Analyst*, February 1988, Vol 113). In fact, prior art (U.S. Pat. No. 4,681,769) claims a process for counter-current, high pressure extraction of Capsicums at less than 100° F. and less than 500 PSI for the express reason of protecting the extracted oil from oxidation.

To confirm the positive effect of high temperature treatment in more controlled conditions, a forty gram sample of hexane-extracted oleoresin paprika, with no diluents added, was heated in a beaker on a heated stir plate at 100° C. for eight and one-half hours. A control sample which was unheated, a sample pulled from the heated beaker after four hours, and a sample of the material heated for the full eight and one-half hours were dispersed on flour salt to make dispersions of 1.2% oleoresin by weight of flour salt. Two gram-portions of the dispersions were weighed into test tubes and placed in a 65° C. oven. An initial ASTA color was run on each dispersion and then ASTA colors were run periodically and the results were plotted versus time to determine the relative stability of the heated and unheated samples. The results are shown in Table 6. It can be readily observed that the heat-treated samples, although they lose some initial color during the heating process, have improved stability over time, thus confirming the improved resistance to oxidation observed in Table 5.

TABLE 6

ASTA VALUES OF HEATED & UNHEATED OLEORESIN PAPRIKA (EXTRACT) OVER TIME

| Hours | Unheated | Heated 4 @ 100° C. | Heated 8 @ 100° C. |
| --- | --- | --- | --- |
| 0 | 32.5 | 31.5 | 26.0 |
| 2 | 29.0 | 29.0 | 25.8 |
| 4 | 26.0 | 28.0 | 25.7 |
| 6 | 24.0 | 27.0 | 25.5 |
| 8 | 22.5 | 25.8 | 25.3 |
| 10 | 21.0 | 24.5 | 25.0 |
| 12 | 20.0 | 23.0 | 24.8 |
| 14 | 19.0 | 22.3 | 24.5 |
| 16 | 18.0 | 21.8 | 24.0 |
| 18 | 17.0 | 21.0 | 23.5 |
| 20 | 16.0 | 20.0 | 23.0 |
| 22 | 15.1 | 19.0 | 22.5 |
| 24 | 14.2 | 18.5 | 22.1 |
| 26 | 13.4 | 18.0 | 21.8 |
| 28 | 12.9 | 17.5 | 21.4 |
| 30 | 12.5 | 17.0 | 21.0 |

The non-rehydrated press residual solids produced in Example 2 exhibit decreased resistance to oxidative color loss at the press operating temperatures are increased as predicted by prior art (Bennett et al, U.S. Pat. No. 4,681,769) and as seen in Table 7.

TABLE 7

STABILITY OF NON REHYDRATED PRESS SOLIDS AT VARIOUS PRESS OPERATING TEMPERATURES, EXPRESSED AS PERCENT OF STARTING COLOR RETAINED

| Temperature Degree F | Week 2 | Week 4 | Week 6 |
| --- | --- | --- | --- |
| 80 | 86.7% | 82.2% | 85.5% |
| 130 | 89.6% | 85.5% | 84.6% |

TABLE 7-continued

STABILITY OF NON REHYDRATED PRESS SOLIDS AT VARIOUS PRESS OPERATING TEMPERATURES, EXPRESSED AS PERCENT OF STARTING COLOR RETAINED

| Temperature Degree F | Week 2 | Week 4 | Week 6 |
| --- | --- | --- | --- |
| 170 | 73.3% | 65.3% | 58.1% |
| 225 | 61.7% | 35.8% | 32.5% |
| 245 | 68.2% | 31.0% | 19.3% |

But, very importantly, it can be seen that the press residual solids which are rehydrated immediately after exiting the second press stage of the process (Example 2) exhibit significantly increased stability (Table 8) relative to the non-rehydrated solids, thus overcoming the claimed disadvantages from operating at temperatures above 100° F. as set forth in U.S. Pat. No. 4,681,769.

TABLE 8

STABILITY OF REHYDRATED PRESS SOLIDS AT VARIOUS PRESS OPERATING TEMPERATURES, EXPRESSED AS PERCENT OF STARTING COLOR RETAINED

| Temperature Degree F | Week 2 | Week 4 | Week 6 |
| --- | --- | --- | --- |
| 80 | 90% | 92% | 91% |
| 130 | 93% | 91% | 92% |
| 170 | 92% | 92% | 91% |
| 225 | 94% | 93% | 91% |
| 245 | 95% | 94% | 93% |

In fact, after discounting for the effect on pigment stability of increasing residual extractable yields in the press solids (Tables 4 & 11) obtained at the lower temperatures, the carotenoid pigments in the residual solids would show enhanced stability for a given residual extractable yield. These are surprising and unexpected results and clearly overcome the supposed obstacle of operating at elevated press temperatures and pressures.

It is further surprising that the color stability of the residual press solids is significantly improved by controlling the water activity ($A_w$) of the solids in ranges above those suggested for the stabilization of lipid-containing systems by extensive studies and particularly by Nelson and Labuza, *Water Activity and Food Polymer Science: Implications of State on Arrhenius and WLF Models in Predictina Shelf Life*, K. A. Nelson & T. P. Labuza, *Journal of Food Engineering* 22, 271–289 (1994). Water activity is defined as the ratio of the vapor pressure of water in a food to the vapor pressure of pure water at the same temperature. Prior art suggests that maximum stability of lipid systems should be attained at water activities of about 0.3 with decreasing stability developing as the water activity is increased above this level. In this example we find precisely the inverse effect on stability of the carotenoid pigments for a given water activity.

In order to confirm the effect of high temperatures in the pressing operation, and to confirm the effect of added moisture, a controlled test was performed on a laboratory scale where the effect of levels of extractable yield in the cake could be controlled to eliminate the effect of variable press cake residual yields on the stability of the carotenoids. A 3,000 gram sample of ground paprika solids (175 ASTA, 9.8% extractable yield) was dried in a lab tray dryer at 100° F. for 16 hours to a moisture content of about 2%. One half of this sample was then heated in an oven at 220° F. for twenty minutes to approximate the temperature in a pressing operation according to the invention. The other unheated sample served as a control. One hundred gram samples of each of the two materials were rehydrated at approximately 1% intervals up to about 12% moisture. The water activity $A_W$ of each was determined using a Rotronics Hygroskop DT, model DT2/1-00IV, water activity instrument. Samples were weighed into sealed test tubes, stored at ambient temperatures of about 72° F. in the dark, and the ASTA colors were determined over a period of eighteen weeks to determine the relative rates of color degradation. The color retained (as a percentage of the starting color for each sample to compensate for the effect of color dilution with the rehydration water) was plotted against time.

TABLE 9

PERCENT COLOR RETAINED OF UNHEATED GROUND PAPRIKA AT VARIOUS WATER ACTIVITY RANGES

| Water Activity $A_w$ | Week 1 | Week 5 | Week 18 |
|---|---|---|---|
| 0.15 | 74% | 57% | 42% |
| 0.30 | 50% | 45% | 12% |
| 0.40 | 68% | 50% | 43% |
| 0.60 | 83% | 68% | 55% |

TABLE 10

PERCENT COLOR RETAINED OF HEATED GROUND PAPRIKA AT VARIOUS WATER ACTIVITY RANGES

| Water Activity $A_w$ | Week 1 | Week 5 | Week 18 |
|---|---|---|---|
| 0.15 | 66% | 56% | 41% |
| 0.30 | 60% | 50% | 45% |
| 0.40 | 80% | 62% | 57% |
| 0.60 | 98% | 82% | 78% |

Figure 1:
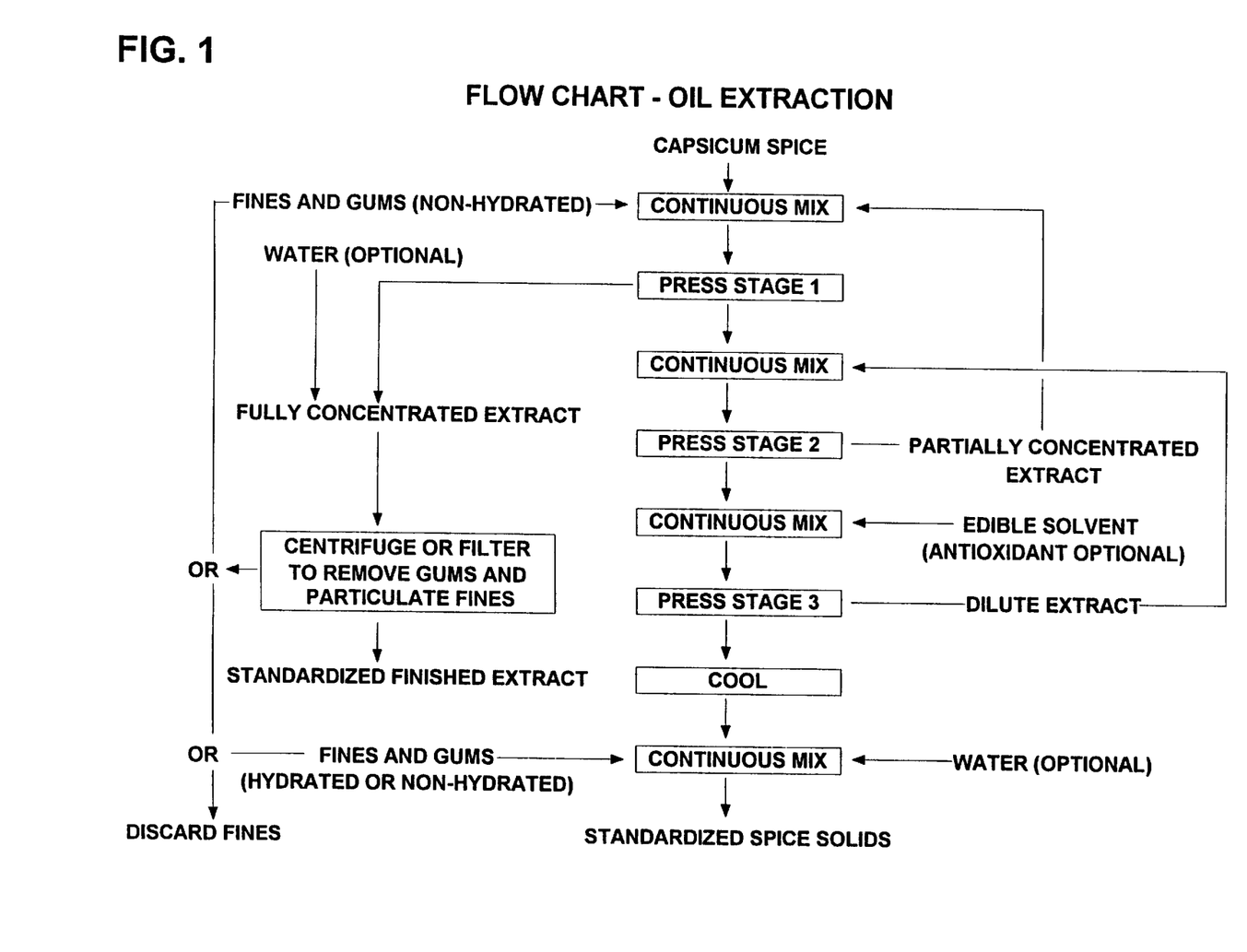
FIG. 1 illustrates the process of the present invention, including the several process steps involved in the simultaneous extraction and concentration of herb or spice solids, e.g., Capsicum solids, to produce the desired extract and sterilized residual solid, both of which have increased resistance to oxidative degradation, and which can be readily standardized to desired levels of the principal components of interest. Although the process illustrated comprises three extraction stages, the number of stages can be decreased to two or increased to more than three to effect the desired relative principal component concentration in the extract and in the residual solid.
Figure 2:
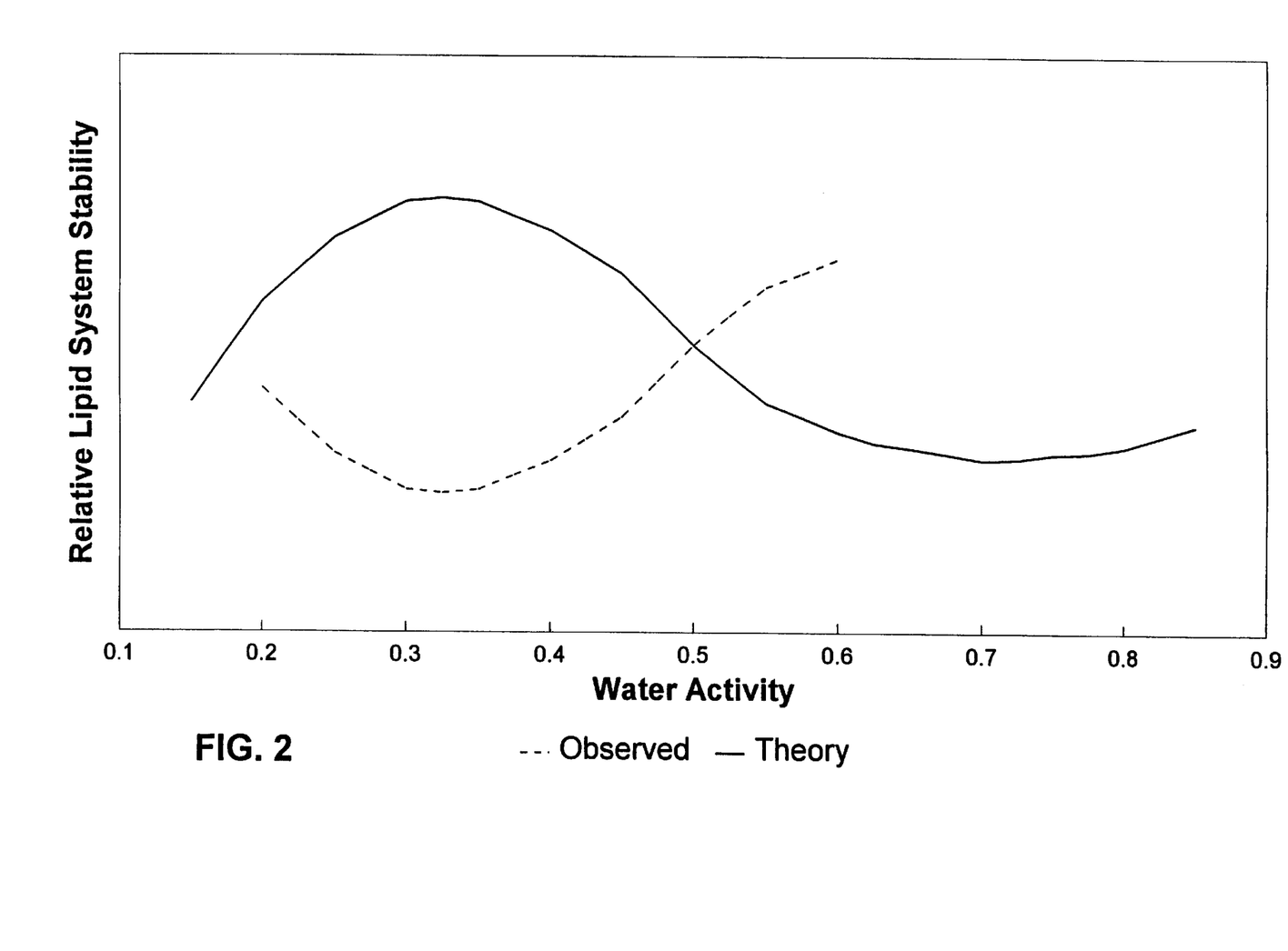
FIG. 2 illustrates the relationship between the water activity and relative lipid stability of food systems as incorrectly described in current literature and as currently found.

It can be seen in Tables 9 & 10 that the stability of the carotenoid pigments follows almost precisely the inverse of the curve predicted by Nelson & Labuza (FIG. 2). It can also be seen from these tables that controlled temperature (with concurrent browning) significantly enhances the stability of the carotenoids above a water activity of 0.3 and particularly in the water activity range of 0.4 to 0.6. Water activity ranges higher than 0.6 were not tested as levels marginally higher than this range will support microbial growth which is not acceptable in a dry spice product.

It can be concluded that the stability of the carotenoid pigments found in Capsicums unpredictably does not follow the commonly-accepted and predicted pattern for lipid oxidation with respect to temperature and water activity as suggested in U.S. Pat. No. 4,681,769, or in the cited literature (Nelson and Labuza, *Water Activity and Food Polymer Science: Implications of State on Arrhenius and WLF Models in Predicting Shelf Life*, K. A. Nelson & T. P. Labuza, Journal of Food Engineering 22, 271–289 (1994); *Rancidity and its Measurement in Edible Oils and Snack Foods, A Review*, Robards, Kerr, and Patsalides, *Analyst*, February 1988, Vol 113); describing the stability of lipid systems. In fact, high temperature treatment, combined with rehydration of the press solids to a water activity above 0.3, preferably of 0.4 to 0.6, significantly improves stability rather than decreases it. This is a very surprising and unpredicted result.

It is well known that the lipid profile of Capsicum and its extracts, without the addition of any diluents, comprises a mixture of saturated and unsaturated fatty acids, 60–70% being unsaturated linoleic and linolenic, *Lipid and Antioxidant Content of Red Pepper*, Daood, Biacs, et al., Central Food Research Institute, Budapest, Hungary (1989) and *The Nature of Fatty Acids and Capsanthin Esters in Paprika*, Nawar et al., Journal of Food Science, Vol 36 (1971). In fact, Daood et al suggest that " . . . the presence of triglycerides containing high amounts of unsaturated fatty acids may be an important factor contributing to the fading of paprika during processing and storage." The present findings are just the opposite. Without in any way being limited by theoretical considerations, it is hypothesized that the presently-discovered surprising and unpredicted inverse relationship shown (in Tables 9 & 10) between the stability of carotenoid pigments at given water activities is due to the fatty acids in the substrate being preferentially attacked by the oxidation reaction at the low (from about 0.05 to 0.2 $A_w$) and higher water activity ranges (above 0.3, preferably about 0.4 to 0.6 $A_w$), thus protecting the carotenoids. At the intermediate water activity ranges (0.2 to 0.4 $A_w$), where the lipids are best protected, the carotenoids are more readily and preferentially attacked and exhibit low resistance to oxidative degradation.

Another controlled test was conducted to demonstrate the effect of different extractable yields in the residual solid press cake. The effect of higher amounts of unsaturated fatty acids is evident from the results illustrated in Table 11 where fresh, refined, bleached, and deodorized soybean oil with no antioxidants was added at various percentages based on the weight of the paprika. The color over time was compared to the untreated control in an accelerated study at 65° C. A typical Refined, Bleached, and Deodorized soy oil has a fatty acid composition of 22.3% Oleic (18:1), 51% linoleic (18:2), and 6.8% linolenic (18:3). (*Riegel's Handbook of Industrial Chemistry*, 9th Edition, pg 278). It can be concluded that higher levels of unsaturated fatty acids, such as oleic, linolenic, and linoleic, which are found in most vegetable oils, will improve the color stability of the press residual solids. Levels of extractable yield in the residual solids above about 15–20% by weight of the residual solids is undesirable as the residual Capsicum solids become difficult to handle for most uses and the efficiency of extraction is reduced, i.e., less color can be removed from the spice as the residual yield is allowed to increase by decreasing either the pressure or temperature employed.

TABLE 11

PERCENT COLOR RETAINED WITH VARYING AMOUNTS OF SOY OIL ADDED TO GROUND PAPRIKA

| Percent Addition | Hour 2 | Hour 4 | Hour 6 | Hour 8 |
|---|---|---|---|---|
| 0% | 65% | 59% | 52% | 50% |
| 5% | 90% | 83% | 74% | 72% |
| 10% | 92% | 84% | 75% | 74% |
| 15% | 94% | 87% | 80% | 78% |
| 20% | 96% | 91% | 83% | 81% |

It is readily apparent, comparing the results of the controlled test (Tables 9 & 10) on stability of heated vs unheated material, where oil is controlled at a constant level that, at a given added soy oil content in the press residual solids, the color stability of the residual press solids is significantly improved when the spice, e.g., a Capsicum, has been exposed to higher temperatures. This conclusion is not readily apparent in the results shown in Table 8 where the amount of residual vegetable oil left in the press residual solids is higher in the low temperature ranges due to the decreased efficiency of the extraction process at lower temperatures (Table 4). The presence of higher amounts of residual oils there offers some protection which overshadows the increased protective effect at higher temperatures so evident in Tables 9 & 10.

It can therefore be concluded that much, if not all, of the protection offered by operating the presses at temperatures lower than 100° F. (as claimed in U.S. Pat. No. 4,681,769) as compared to temperatures above 100° F. is simply due to the higher residual oil levels (reduced extraction efficiency) and that, for any given residual oil content, and with rehydrated residual solids, the operating temperatures above 130° F. give superior results, not only in an increased extraction efficiency which allows for a continuous, high speed process with increased throughput rates and significantly reduced microbial activity, but most surprisingly in an increased color stability of both the extract and the residual press solids, particularly when the press solids are rehydrated.

Comparative Example: According to Bennett U.S. Pat. No. 4,681,769,—Low Temperature and Pressure As can be seen in Table 4, the press solids residual yield is much higher at temperatures below 100° F. and much higher (28.3% residual yield) than disclosed in U.S. Pat. No. 4,681,769 (10–15% residual yield). In Example 2, Table 4, the Model KEK 100 Screw Press used for the test was operated at about 100% of its rated capacity of 240 pounds per hour for typical oil seeds. In an effort to more closely model the residual yields of 10–15% (oil) in the cake as disclosed in U.S. Pat. No. 4,681,769, the feed rate for this test was set at about 95 pounds per hour, thus allowing more residence time in the press to expel more extract and to reduce the residual yield of the press residual solids to 10–15%.

The following Example according to Bennett is a two-step production run.

One lot, comprising about 300 lbs of 160 ASTA chili, ground to pass 20 mesh (USSS), was transferred to a ribbon blender and blended with 13.7% by starting weight of the ground chili of fortified soybean oil having 500 ASTA oleoresin for about 15 minutes and then allowed to stand for about 16 hours at room temperature (75° F.) before transfer to the feed hopper of an Egon Keller Model KEK-100 Screw Press. The feed hopper provides for a controlled flow of the mixture of chili and fortified oil to the press at a rate of about 95 lbs per hour of fresh ground chili, the equivalent of about 800 lbs per hour in a French Oil Mill Machinery Company F-44 press. Both these feed rates represent about 40% of the rated capacity of the respective screw presses on whole oil seeds. The production run was started with a cone setting of about 0.030 inches and with the internal worms configured so as to provide a pressure gradient of essentially little or no pressure up to about 500 pounds per square inch of pressure. At these low pressures and feed rates, effluent oil temperatures were maintained at less than 100° F. with cooling water as in Bennett, and the residual yield (oil) in the press residual solids averaged about 12.5%, just as prescribed by Bennett, who states that:

"Temperatures above 100° F. should be avoided inasmuch as higher temperatures cause oxidation with a resultant destruction of delicate flavor and/or color principle."

With the press operating as described, the oil extracted, after centrifugation to remove the residual spice fines, assayed at about 1000 ASTA and the press cake residual solids fraction had a corresponding reduction in ASTA to about 115.

The press cake of the once-extracted ground fresh spice from the first pressing is further processed following the same procedure above described for the first blending/pressure extraction sequence using, however, fresh soybean oil as an additive in place of the fortified oleoresin soybean oil. The fortified soybean oil extracted assayed at approximately 500 ASTA. This 500 ASTA fortified soybean oil extract is recycled as an extractant on fresh ground chili. The extracted chili powder cake from this extraction step had a corresponding reduction in ASTA value to an average of about 65 ASTA (ranged from 41 to 95 ASTA). The results of this low temperature, low pressure test are compared to results of high temperature, high pressure conditions in Example 2 and are shown in Table 12.

TABLE 12

Comparison of Low Temperature/Low Pressure and High Temperature/High Pressure

|  | Low Temp/Low Pressure, 16 hour batch mixing | High Temp/High Pressure Continuous from Example 2 |
|---|---|---|
| Temperature, Deg F | 95 | 235 |
| Pressure, psi | <500 | 20,000–30,000 |
| Final Residual Solids ASTA | 65 | 33 |
| Final Residual Solids Yield | 12.5% | 9.3% |
| Final Residual Solids ASTA as a percent of Fresh Chili ASTA | 41.5% | 22% |
| ASTA loss in 1st mixing stage | 7% | 0% |
| ASTA loss in 2nd mixing stage | 10.5% | 0% |
| Final Oleoresin ASTA | 1,000 | 1,000 |

It can clearly be seen, as is also shown in Example 2 (Effect of Varying Operating Temperatures), that the low temperature/low pressure batch process with extended contact times incurs significant color loss during the extended contact times necessary for low temperature/pressure extraction. In addition, the low temperature/pressure batch process does not remove the color as efficiently as with higher temperatures and pressures for any given size pressing operation.

The foregoing example can scientifically be scaled up or extrapolated into a comparative two-stage production run using two Model 44-F French Oil Mill Machinery Company presses, as follows:

One lot comprising about 3,840 lbs of 5% moisture, 160 ASTA, 20 mesh, fresh ground chili solids (*Capsicum annum*) is passed through a high speed, high shear, steam-jacketed paddle mixer on a continuous basis and fed directly into the press feed hopper at stage one, through the 1st stage press, into a 2nd stage paddle mixer, and then to the 2nd stage press. Soybean oil is added continuously through a metering pump into the paddle mixer at stage 2 at the rate of 13.7% by weight of the starting ground chili solids (525 lbs of oil for the 3840 lb run). The raw material chili solids are continuously fed at a rate of about 2,500 lbs per hour to the system with a total contact time in each paddle mixer of about 15 seconds. The temperature of the chili/oil mix exiting the paddle mixer is maintained at about 180° F. at stage 2 and about 150° F. at stage 1.

The oil/extract expelled from the second pressing stage is returned on a continuous basis to the paddle mixer at stage one wherein the oil/extract and fresh ground paprika are mixed in preparation for the first pressing stage. The oil/extract and fresh ground paprika exit the first stage paddle mixer and enter the first stage press at about 150° F., the temperature being controlled by the amount of steam on the paddle mixer jacket.

The concentrated oil/extract expelled from the first pressing stage is hydrated with water to about 75% by weight of the fines (fine particulate solids) and gums and is then centrifuged and the hydrated fines and gums are added to the residual press solids from the final (second) pressing stage in a high shear mixer, after the solids have passed through a water-jacketed cooling screw.

The internal shaft and collar arrangements of the press are configured so as to provide internal pressures of about 20,000 to 30,000 PSI and cooling water is maintained at a flow rate through the bore of the shaft and through the cage cooling jackets so as to maintain an exit oil temperature at the external cage surface of about 180 to 200° F. and an exiting residual solid cake temperature of about 235° F. The residual cake solid is cooled in a water-jacketed screw conveyor to about 85° F. and water, in addition to the hydration water used to remove the fines and gums from the extract, is injected into the high shear, continuous mixer to rehydrate the cake to a water activity of about 0.6.

The concentrated extract exiting press stage one has an ASTA value of about 1,000 and the residual press solid cake exiting stage two has an ASTA value of about 45. The residual press solid cake has a reddish-brown appearance typical of lightly toasted chili powder. The aerobic plate count of the residual solid cake is about 70,000.

The same test is repeated (according to the Bennett Example). No heat is applied during the mixing stages and the press internals are reconfigured so as to provide for minimal friction and compression and the resultant minimal heat generation during the pressing operations. The working compression is supplied primarily by the cone at the cake discharge and is maintained at about 500 PSI. Oil is added at a rate of about 13.7% by weight of the starting paprika solids (525 lbs for the 3840 lb batch) and mixed in a ribbon blender for sixteen hours and then fed at ambient temperature (about 75° F.) to the pressing system. The feed rate through the pressing stages is maintained at 800 pounds per hour. Cooling water is supplied to the internal bore of the shafts and the cooling jackets to maintain exit oil temperatures of less than 100° F. on both the expelled oil and the residual press cake. The extract exiting the first pressing stage of the press is centrifuged without hydration of the gums and fine particulate solids.

The concentrated extract exiting press stage one has an ASTA value of about 1,000 and the residual cake solid has an ASTA value of about 65. The appearance of the cake is lacking the brownness characteristic of commercially-available ground paprika and chili powder and would require a separate browning step to make it acceptable for common uses. The material is difficult to regrind due to the high level of residual extractable yield left in the cake, it is not flowable, and it must be combined with other solid materials to make an acceptable product for sale. The aerobic plate count is about 220,000. A comparison of the results of the two tests is shown in Table 13.

TABLE 13

|  | High Temperature Pressing | Low Temperature Pressing |
|---|---|---|
| Mixing Time, Soy Oil | Continuous, (Seconds) | 16 Hours |
| Fresh Oil Temp, ° F. | 75 | 75 |

TABLE 13-continued

|  | High Temperature Pressing | Low Temperature Pressing |
|---|---|---|
| Oil/Chili Stage 1 at Press Feed, ° F. | 150 | 75 |
| Oil/Chili Stage 2 at Press Feed, ° F. | 180 | 75 |
| Cake after Stage 1 Pressing, ° F. | 225 | 95 |
| Cake after stage 2 Pressing, ° F. | 235 | 95 |
| ASTA Value, Extract | 1000 | 995 |
| ⅔ Life, Extract, 65° C., Hours | 25 | 16 |
| ASTA Value, Press Cake | 45 | 65 |
| ⅔ Life, Cake, 72° F., Weeks | 32 | 10 |
| Color Recovery, Extract | 75% | 51% |
| Aerobic Plate Count, Extract | 70,000 | 2,000,000 |
| Aerobic Plate Count, Cake | 2,000 | 220,000 |
| Overall Color Recovery (Extract and Cake) | 98% | 91% |
| Visual appearance, Cake | Red-brown | Red-tan |
| Throughput rate, lbs per hour | 2,500 | 800 |

It is readily apparent that there are substantial advantages to higher temperatures and pressures. The color recovery is enhanced, there is a 50% increase in yield to the extract, the rate for a given press size is increased by over 300%, the color stability of the extract is improved by 65%, the color stability of the residual solids cake is improved by 300%, and the aerobic plate count is reduced by a factor of greater than 30 in both the extract and the residual cake; all without the oxidative color losses that are alleged to be an obstacle in U.S. Pat. No. 4,681,769.

ADDITIONAL EXAMPLES STARTING FROM VARIOUS NON-CAPSICUM SPICE OR HERB PLANT SOLIDS

In addition to the foregoing, the following examples show the applicability of the process of the present invention in the production of herb or spice plant extracts and solids having greatly reduced bacterial counts and without the deterioration alleged by the prior art to occur at temperatures above about 100° F., especially at low water contents which are also contraindicated by the prior art, and with the production in each case of residual spice or herb plant solids having its tissue ruptured so as to produce quick release of the flavor, aroma, color, or antioxidant component therein when in actual use in a food or beverage, thereby greatly increasing the use effectiveness thereof, and both extract and solids produced by the process being readily standardized with respect to the principal flavor, aroma, color, or antioxidant component of interest.

EXAMPLE 3

Paprika Extraction and Flavor/Aroma Activation

Paprika is processed in the same manner as given in Examples 1, 1a, 1b, or 2 using a multiple stage, counter-current process with temperatures being in excess of 130° F. with the residual solids being rehydrated to a water activity of 0.6. By adjusting the amount of edible, food grade solvent, and the pressures and temperatures in the pressing stages, the residual cake solids are standardized with respect to ASTA color value to produce paprika solids with ASTA color values equivalent to ground paprika commonly used commercially as described in the above examples.

A sample of the residual cake solids at 120 ASTA was reground to pass US 40 mesh and was compared to the starting, unextracted spice, also ground to pass US 40 mesh and rehydrated to a water activity of 0.6, with respect to flavor and aroma intensity. Ten grams each of the residual cake solids and the unextracted spice were thoroughly mixed with 50 grams of flour salt to make a dispersion that would typify a coating for snack foods used to impart a paprika flavor and aroma. Triangle tests were done on the samples. The samples were coded with random three digit numbers and twelve expert panelists were asked to identify the sample that had the highest paprika flavor and aroma. Twelve of twelve panelists picked the reground residual cake solids as having a more intense paprika aroma. Eight of twelve picked the reground residual cake solids as having a more intense paprika flavor. By statistical analysis (according to methods described in *Sensory Evaluation Techniques*, Vol II, by Morten Meilgaard, 1987, page 133) this clearly demonstrates that the residual cake solids have more intense paprika aroma and flavor available in a food system as a result of the high pressure, high shear forces and the attendant disruption of the flavor and aroma containing tissue of the spice.

Example 3a Color Activation

A sample of 120 ASTA ground residual cake solids was prepared as in Example 3 above. This was compared to a sample of commercially available 120 ASTA paprika with regard to effective color release into water to model color release under conditions typical of those used to prepare a marinade or sauce. One (1) gram each of the ground residual cake solids and commercial ground paprika were added to 100 ml of distilled water and stirred for two (2) minutes at ambient temperature. The slurries were then filtered to remove all particulate solids and the absorbance of each of the solutions was measured spectrophotometrically at 460 nm. The absorbance of the water solution prepared using the residual press solids was 0.566. The absorbance of water solution prepared with the commercial ground paprika was 0.294. This clearly demonstrates that the effective utilization of the color, and the color intensity of the model sauce system, were significantly enhanced by the high pressure, high shear, and high temperature of the pressing and extraction process, which ruptures the tissues of the plant solids.

EXAMPLE 4

Chipotle Extraction and Flavor/Aroma Activation

Chipotle (smoked and dehydrated Jalapeno capsicum pepper) at 4% moisture is ground to pass US 40 mesh and extracted in a two-stage countercurrent pressing operation with the addition of 6% of an edible solvent mixture consisting of 95% soybean oil and 5% decaglycerol tetraoleate (Mazol PGO 104K) by weight of the starting spice in the same manner as described in the above Examples. The principal components of interest in this spice are the flavor (including capsaicinoids which impart the pungent flavor typical of chili peppers) and aroma compounds (including the smokey aroma).

The pungency of the starting ground Chipotle is 35,000 Scoville (ASTA method 21.0). The pungency of the extract is 200,000 Scoville and the pungency of the residual cake solids is 20,000. Both the extract and the residual cake solids have the characteristic smokey aroma of the starting spice.

By varying the addition rate of the soybean oil, the concentration of pungent principles is varied in both the extract and the residual solids. For example, using a 12.5% soy oil addition results in an extract with a Scoville pungency of 165,000 and a residual cake solid of 15,000 Soville. Increasing the soy oil addition to 15% results in an extract of 150,000 Scoville and a residual solid of 7,500 Scoville. This clearly demonstrates that the spice solids can be predictably standardized effectively and efficiently with respect to the principal flavor compounds without the requirement of traditional blending and replating of solvent-extracted oleoresins as described in prior art (U.S. Pat. No. 2,507,084).

The aroma of the residual cake solids is compared to that of the starting unextracted spice using the Triangle method described in Example 3 by dispersing 10 grams of each in 50 grams of flour salt. Six of the twelve panelists can not pick the extracted Chipotle residual solids as being different from the unextracted starting spice, clearly demonstrating that the high pressure, high shear process provides for a ruptured spice residual solid with equivalent aroma intensity even though a portion of the principal components of interest have been removed with the extract.

The starting raw spice has an aerobic plate count of 80,000,000. The plate count of the final extract and residual cake solids are 15,000 and 1,100,000 respectively, again demonstrating that significant reduction in microbial activity can be achieved at such low water contents.

EXAMPLE 5

Onion Extraction—Flavor and Aroma Activation

Dehydrated, toasted onion powder (Gilroy Foods, Inc. 92700 Toasted Special Onion Powder) was processed in a high pressure extraction system comprising two pressing stages, using Egon Keller Model KEK-100 Screw Presses. Glycerol monooleate containing 10% propylene glycol (Mazol DF300K) was added to the high shear mixing stage prior to the second pressing stage at 25% by weight of the starting spice. The raw material onion was continuously fed at a rate of about 150 lbs per hour with a total contact time in the pressing stages of about 120 seconds. The pressing stage was operated at about 6,000 psi internal pressure and about 190° F., which was maintained by cooling with water through the bore of the press shaft as needed.

The principal components of interest in both the extract and the residual solids are flavor and aroma constituents typical of toasted onion powder. The resulting final extract from the pressing process has the characteristic aroma and flavor profile at a level approximately 4 times the strength of the starting spice as determined by plating the extract on flour salt at varying concentrations and subjecting the resulting dispersions to triangle tests as described in previous examples compared to the unextracted spice. This clearly demonstrates that the flavor and aroma components of the raw spice can be effectively extracted using high pressure, high temperature mechanical pressing.

The residual cake solids are compared to the unextracted spice by dispersing 20 grams of each in 200 ml of salad oil as in Example 3a above, stirring for 5 minutes, and filtering to remove all particulate solids to compare the effectiveness of flavor release into a model salad dressing system. Twelve trained panelists are asked to pick which salad oil has a more intense toasted onion flavor. Twelve of twelve pick the salad oil prepared with the residual cake solids as having superior and more intense toasted onion flavor and aroma. This is a very surprising and unexpected result as a significant portion of the flavor and aroma of the starting spice was removed with the extract.

Without in anyway being limited by theoretical considerations, it is hypothesized that the nature of the edible solvent system used, in combination with the high temperature, high pressure, and high shear forces generated during the processing of the spice, result in a ruptured spice tissue matrix with the flavor and aroma compounds remaining in the residual cake solids being readily soluble in salad oil which otherwise does not readily dissolve the principal components of interest. It is clear that this process provides very significant economic and functional value over prior art.

EXAMPLE 6
Black Pepper Extraction, Standardization, and Flavor Activation

Black Pepper, ground to pass US 30 mesh, was subjected to a two-stage, countercurrent extraction process as demonstrated in the previous Examples using Triacetin (glycerol triacetate) as the edible solvent at 7% by weight of the starting spice. The temperature of the residual cake solids exiting the pressing stages was maintained at about 215° F.

The piperine content of the starting spice was 11% by ASTA method 12.1. Piperine is responsible for the characteristic pungent flavor of black pepper. The final extract, after filtering to remove the fine particulate solids, had a piperine content of 41.6% and the residual cake solids had a piperine content of 4.1%, typical of commercially-traded grades of black pepper commonly used in food preparation.

An expert panel compared the ground residual cake solids to commercial ground black pepper at 4% piperine. The panelists unanimously picked the residual cake solids as being more pungent, demonstrating that the high pressure, high shear treatment in combination with an edible food solvent provide a surprisingly improved residual spice solid, as compared to an untreated spice having equivalent levels of the principal compound of interest. This presents a clear advantage over prior art.

EXAMPLE 7
Rosemary Extraction and Standardization of Antioxidants

Ground, dried Rosemary at 6% moisture was processed in accordance with the procedures described in Example 6 but using a medium chain triglyceride based on caprylic/capric fatty acids (Neobee M-5, produced by the Stepan Company) at a level of 40% by weight of the starting spice, with temperatures of the residual cake solids maintained at about 250° F. with cooling water or steam as needed through the bore of the press shafts. The starting raw material had levels of Carnosol and Carnosic acid, two of the primary antioxidant compounds present in rosemary, of 0.46% and 2.47% respectively, for a total of 2.93% by weight of active compounds. Carnosic acid and Carnosol levels were determined by extracting a sample with a methanolic solution of Bisphenol A (internal standard). The extract therefrom was analyzed by reverse phase HPLC on a C-18 column using a gradient mobile phase of methanol and methanol: aqueous citric acid buffer and UV detection at 280 nm. The method can be calibrated using a pure sample of Carnosic acid and Carnosol. The final extract, after centrifuging to remove the fine particulate solids, had 0.49% Carnosol and 5.80% Carnosic acid for a total of 6.2% by weight of active compounds or a two-fold increase in concentration from that of the starting spice. The residual cake solids contained 0.21% Carnosol and 0.23% Carnosic Acid for a total of 0.44% by weight active compounds. This represents about 15% of the active compounds found in the starting spice.

This surprisingly demonstrates that, contrary to prior art, the antioxidant compounds can be efficiently extracted in a continuous, high speed, high pressure process with levels of edible solvent considerably below those disclosed by prior art, providing an extract produced by such a process that is clearly superior in levels of antioxidants. Prior art, in particular U.S. Pat. No. 3,732,111, discloses a method for extraction of Labiatae herbs using prohibitively high ratios of edible solvent in relation to the weight of the starting spice. This necessarily, by simple dilution, results in an extract of low antioxidant concentration that make the extract so weak with respect to the active compounds that it cannot be used in many food systems where the volume of edible solvent in relationship to the compounds of interest is simply too high.

By varying the ratio of edible solvent to ground spice, and the number of countercurrent pressing stages, the levels of active compounds in the extract and residual solids can be controlled in the same manner as described in previous examples.

The starting ground rosemary had an aerobic plate count of 7,000,000. The final extract and residual cake solids had plate counts of 600 and 35,000 respectively. Again, contrary to prior art which suggests that elevated moisture contents and lengthy holding time are necessary, the present process dramatically and rapidly sterilized both the extract and residual solids at such low moisture contents due to the high temperatures, pressures, and shear forces employed.

EXAMPLE 8
Turmeric Extraction, Standardization, and Sterilization

Using the general procedures as described in the previous Examples, turmeric at 3% moisture and containing 6% curcumin (ASTA method 18.0) was extracted using 10% by weight of Polysorbate 80®, a polyoxyethylene sorbitan ester, in a countercurrent, two-stage pressing operation with the temperature of the residual cake solids being maintained at about 220° F. Curcumin is the pigment responsible for the intense yellow color of turmeric. The final filtered extract and the residual cake solids are 20% and 3.5% curcumin respectively.

The plate count of the starting spice is about 50,000,000, the final extract 25,000, and the final residual cake solids 1,500,000. Again, contrary to the teachings of prior art, at such low moisture contents.

By varying the amount of edible solvent added prior to the second pressing stage, the levels of curcumin can be accurately and predictably controlled in both the extract and residual cake solids as described in previous examples.

EXAMPLE 9
Oregano Extraction, Standardization, Activation, and Sterilization In the same manner as given in previous Examples, ground oregano at 5% moisture is processed in a two-stage, countercurrent extraction process using 10% by weight of soy bean oil. The presses are operated at about 230° F. as measured by the temperature of the cake exiting the pressing stages. The presses are operated at about 20,000 PSI. The plate count of the starting herb is 5,000,000. The plate counts of the final extract and residual cake solids are 800 and 50,000 respectively demonstrating again, contrary to prior art, that the plate counts of spice and herb solids can be significantly reduced at such low moisture contents.

The residual cake solids are compared for flavor strength to the starting ground herb using the method as described in Example 5. Only six of twelve panelists are able to pick the residual cake solids as being less flavorful than the starting ground herb.

EXAMPLE 10

Other Families and Species of Herb and Spice Plant Materials

In the same general manner as given in previous Examples, other spices and herbs at moisture contents of less than 10% that contain color, flavor, aroma, or antioxidant principles, are processed and extracted in accord with the method of the present invention. Such plant materials include, but without limitation, oregano, basil, mint, marjoram, anise, mace, caraway, carrot, garlic, cinnamon, allspice, clove, ginger, cilantro, parsley seed, sesame, cumin, lovage, tarragon, cardamom, fenugreek, mustard, and vanilla, the primary characteristic of such plant materials being that they impart flavor, aroma, color, or preservative qualities to the food or beverage system in which they are used, and by way of illustration but not by way of limitation, in each case to produce a concentrated extract from the first pressing stage and residual cake solids from the last pressing stage, both standardized with respect to the principal components of interest, both with significantly reduced microbial load, and the residual cake solids having "activated" or quick-releasing principal components of interest in the food or beverage system in which they are used, and for those containing carotenoid pigment, increased stability of the pigment in both the extract and residual cake solids. All this being accomplished under conditions contrary to prior art: without the use of non-edible solvents, low temperatures, and high moisture contents which develop off flavors, aromas, and colors; and without excessive volumes of edible solvents resulting in extracts and residual solids of limited application due to their low content of principal components of interest.

It is thereby seen that an improved countercurrent process for the extraction of spice and herb plant solids using an edible solvent, whereby improved yields of both extract and residual solids are obtained, whereby both the extract and the residual solids have improved stability and freedom from bacterial contamination due to the higher temperatures employed, whereby due to optional advantageous rehydration of residual solids and level of water activity employed an improved stability in the residual solids is attained, whereby an extract in the form of a clear solution can be obtained by removal of gums and particulate solids in the form of their insoluble hydrates, whereby even greater stability can be effected by the employment of edible antioxidants in the solvent utilized, whereby controlled browning of the residual solids may be conveniently effected, and whereby the residual spice or herb plant solids have their tissue ruptured so as to produce quick release of the flavor, aroma, color, or antioxidant component therein thereby to provide greatly improved use effectiveness, and whereby all products of the process can be conveniently standardized with respect to the principal flavor, aroma, color, or antioxidant component of interest, all without the expected disadvantages from employing higher temperatures and lower water content as clearly indicated by the prior art, and whereby all of the stated objects of the invention have been accomplished, has been provided.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. A continuous multistage mixing, high pressure pressing, and countercurrent extraction process for the production of a concentrated edible extract and tissue-ruptured quick-release edible residual solids, both of reduced bacterial content compared to starting solids, and both of which contain herb or spice pigment, flavor, and aroma and, when present in the starting material, antioxidant, from starting herb or spice plant solids, comprising the following steps:

subjecting said starting herb or spice solids to a countercurrent extraction process involving a plurality of mixing and pressing stages, including first and last mixing stages and first and last pressing stages, together with up to about fifty percent by weight of an edible solvent selected from the group consisting of vegetable oils, mono-, di-, and tri-glycerides, lecithin, hydrogenated or partially hydrogenated fats and oils, edible animal fats and oils, and mixtures thereof, to produce an extract and residual solids, continuously returning the extract from each pressing stage to the previous mixing stage, and finally separating the extract from the first pressing stage and separating the residual solids from the last pressing stage, the starting solids being subjected to internal pressures in the press stages of 6,000 to 30,000 pounds per square inch, and all pressing stages being carried out at a temperature of at least 130° F., wherein the moisture content of the starting solids is less than 10% by weight, and wherein bacterial count reduction is effected at this low moisture content, thereby avoiding undesirable loss of volatile flavor and aroma constituents and avoiding the development of cooked, off flavors and aromas which occur at higher moisture contents.

2. A process of claim 1, wherein the temperature is 130 to about 450° F.

3. A process of claim 1, wherein the weight of the edible solvent is 5% to about 20% by weight of the solids.

4. A process of claim 1, wherein the solids extracted in the process are selected from the group consisting of chipotle, turmeric, black pepper, onion, rosemary, and oregano.

5. A process of claim 1, wherein the edible solvent is a vegetable oil.

6. A process of claim 1, which includes the steps of hydrating the final extract to add water to the extent of 5% to 200% by weight of the gums and fine particulate solids therein and filtering or centrifuging to remove said hydrated gums and solids.

7. A process of claim 6 including the step of returning the separated hydrated gums and solids to the final residual solids.

8. A process of claim 1, including the step of rehydrating the final residual solids with water to a water activity of about 0.3 to 0.6 $A_W$ for stabilzation thereof.

9. A process of claim 8, wherein the solids are rehydrated to a water activity of about 0.4 to 0.6 $A_W$.

10. A process of claim 1, wherein the temperature is greater than 180° F.

11. A process of claim 1, wherein the temperature is between about 180° F. and 235° F.

* * * * *

UNITED STATES PATENT AND TRADEMARK OFFICE
CERTIFICATE OF CORRECTION

PATENT NO. : 6,013,304
DATED : January 11, 2000
INVENTOR(S) : George N. Todd

It is certified that error appears in the above-identified patent and that said Letters Patent is hereby corrected as shown below:

Column 13, line 42: In Table 2, third column, "590,000" should read -- 500,000 --.

Signed and Sealed this

Seventeenth Day of October, 2000

Attest:

Q. TODD DICKINSON

Attesting Officer

Director of Patents and Trademarks